United States Patent
Kellner et al.

(10) Patent No.: US 12,072,878 B2
(45) Date of Patent: Aug. 27, 2024

(54) SEARCH ARCHITECTURE FOR HIERARCHICAL DATA USING METADATA DEFINED RELATIONSHIPS

(71) Applicant: Oracle International Corporation, Redwood Shores, CA (US)

(72) Inventors: George John Kellner, San Mateo, CA (US); Jung Min Ha, Menlo Park, CA (US); Mark Pearson, Redwood Shores, CA (US); Jingyi Han, San Jose, CA (US); Jennifer Darmour, Seattle, WA (US); Abhay Kumar, Hyderabad (IN); David Barry Groves, Queensland (AU); Hong Tuck Liew, Singapore (SG); Abburi Rahul Krishna Naga Karthik, Vijayawada (IN); Johnson Kunnel Joesph, Hyderabad (IN); Ann Deena Philip, Cupertino, CA (US); Subramanya Sarma Kuchi Venkata Raghavendra, Hyderabad (IN); Jitin Sai Pichika, Telangana (IN); Srinivas Sureshkumar Guthivari, Frisco, TX (US)

(73) Assignee: Oracle International Corporation, Redwood Shores, CA (US)

( * ) Notice: Subject to any disclaimer, the term of this patent is extended or adjusted under 35 U.S.C. 154(b) by 177 days.

(21) Appl. No.: 17/448,489

(22) Filed: Sep. 22, 2021

(65) Prior Publication Data
US 2023/0090050 A1   Mar. 23, 2023

(51) Int. Cl.
*G06F 16/2453* (2019.01)
*G06F 16/22* (2019.01)

(52) U.S. Cl.
CPC ...... *G06F 16/2453* (2019.01); *G06F 16/2228* (2019.01)

(58) Field of Classification Search
CPC .................. G06F 16/2453; G06F 16/2228
See application file for complete search history.

(56) References Cited

U.S. PATENT DOCUMENTS

| 10,997,244 | B2 * | 5/2021 | Russell | G06F 21/56 |
| 2006/0149724 | A1 * | 7/2006 | Ritter | G06F 16/217 |

(Continued)

OTHER PUBLICATIONS

"Database normalization," Wikipedia, retrieved from https://en.wikipedia.org/wiki/Database_normalization, last modified Jan. 3, 2022, pp. 9.

*Primary Examiner* — Allen S Lin
(74) *Attorney, Agent, or Firm* — Invoke

(57) ABSTRACT

Techniques are disclosed for generating a search index for a hierarchical data set so that a search query of the hierarchical data may return results without searching or analyzing the hierarchical data set itself. The techniques generate a flattened index that includes selected indexed attributes and additional attributes to be displayed with the indexed attributes. The techniques also generate a hierarchy representation of the hierarchical data. Using these generated data structures, query results may be returned without directly traversing the hierarchical data itself while also providing data and hierarchical context for the query results by overlaying the query results with nodes of the hierarchical representation or otherwise concurrently displaying the query results with nodes of the hierarchical representation.

17 Claims, 6 Drawing Sheets

(56) References Cited

U.S. PATENT DOCUMENTS

| | | | | |
|---|---|---|---|---|
| 2007/0208723 A1* | 9/2007 | Peterson | ................ | G06F 16/80 |
| 2011/0314028 A1* | 12/2011 | Radomski | ........... | G06F 16/9038 |
| | | | | 707/748 |
| 2014/0379498 A1* | 12/2014 | Hansen | .............. | G06Q 30/0277 |
| | | | | 705/14.73 |
| 2015/0134670 A1* | 5/2015 | Liu | .................... | G06F 16/2246 |
| | | | | 707/741 |
| 2016/0342637 A1* | 11/2016 | Braghin | ................ | G06F 9/5005 |

* cited by examiner

204 — Receive hierarchical data set of data objects, where the data objects are hierarchically related to at least one other data object 208 — Receive metadata identifying attributes in the hierarchical data set to be indexed in a search index 212 — Generate relational data objects to represent the hierarchical data set and storing attribute names and corresponding values from the hierarchical data set in the relational data objects 216 — Generate search index based on attributes identified in metadata 220 — Index attributes and corresponding values 224 — Reference return values, stored in relational data objects, to be returned in response to query for an indexed attribute 300 — Execute received query on search index and display return values

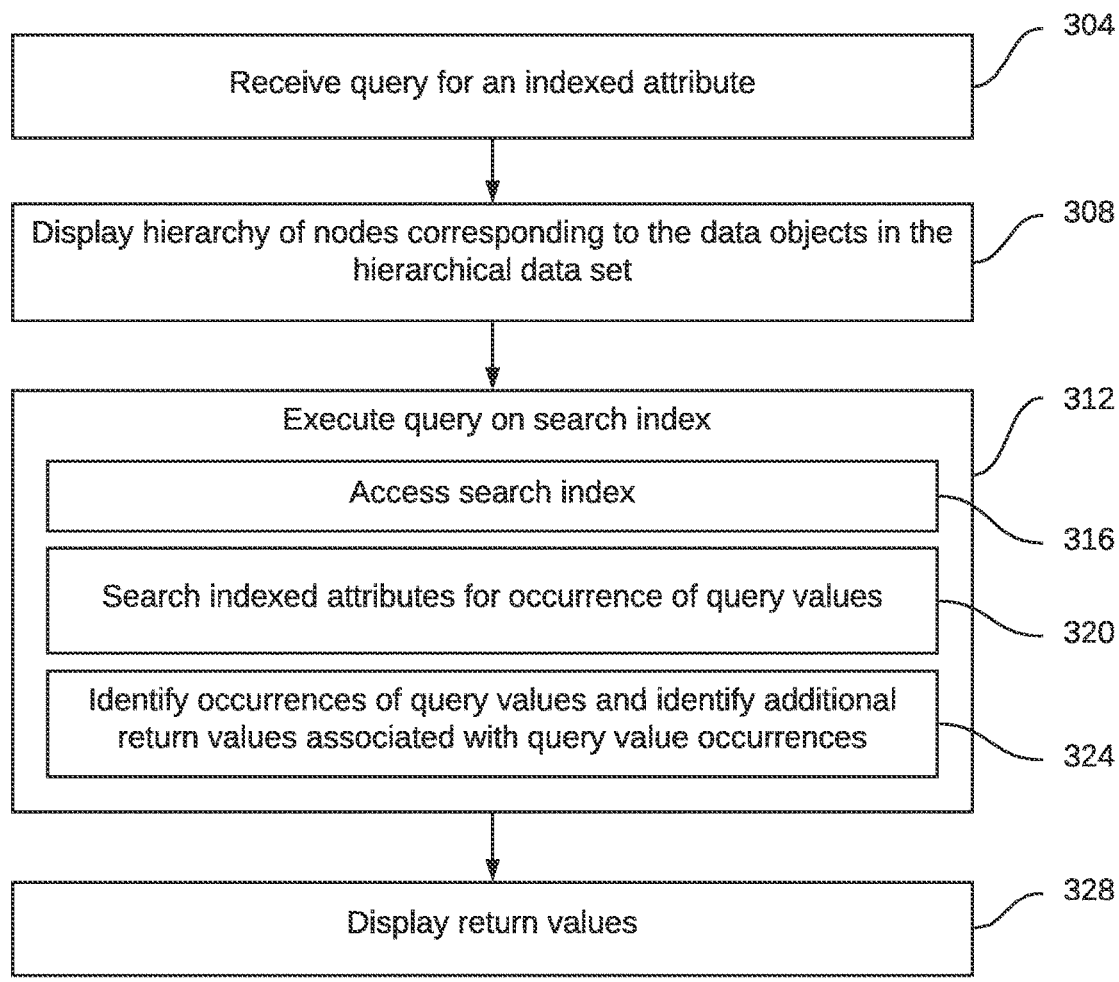

Displayed Hierarchy and Search Results 432

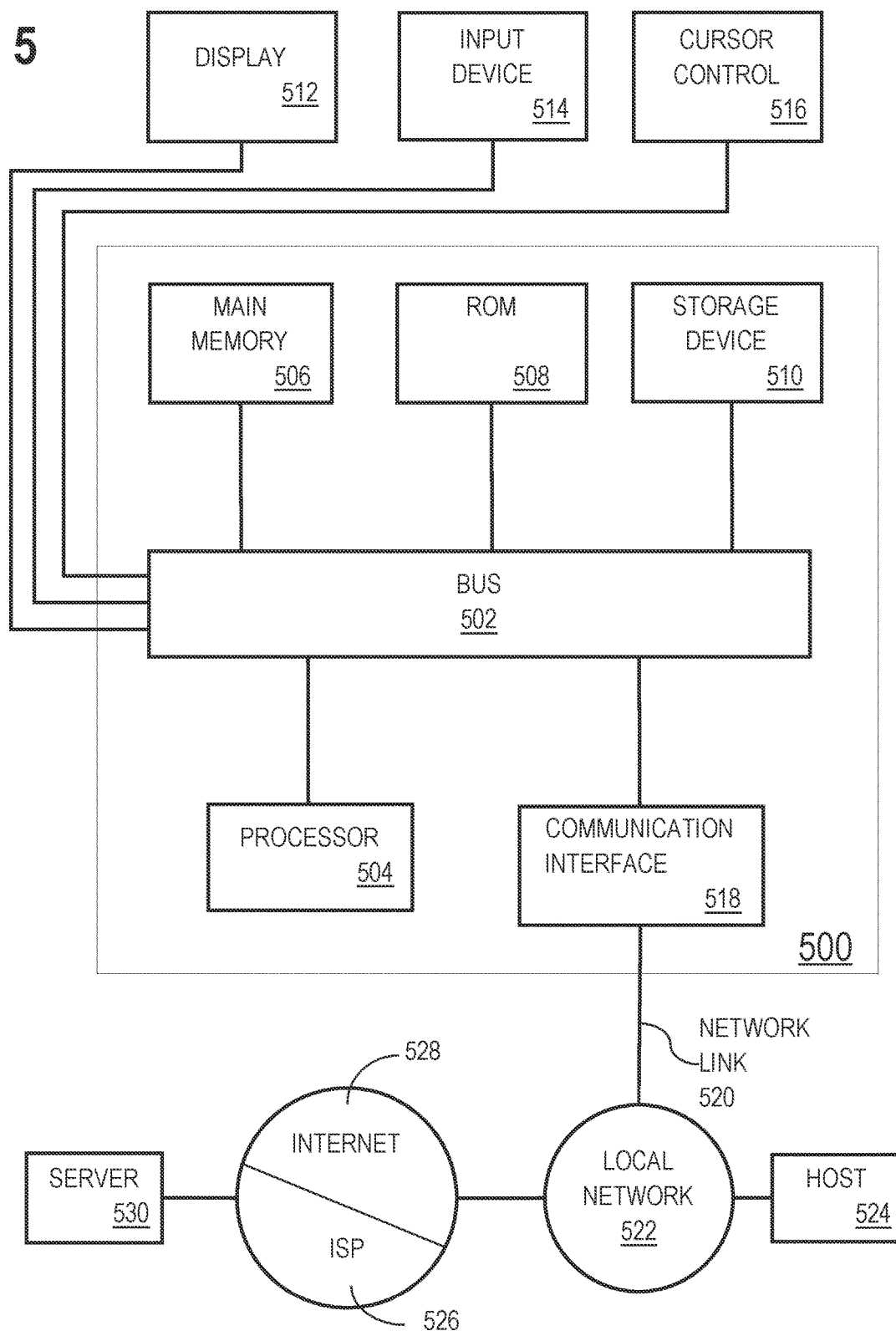

SEARCH ARCHITECTURE FOR HIERARCHICAL DATA USING METADATA DEFINED RELATIONSHIPS

TECHNICAL FIELD

The present disclosure relates to data search techniques. In particular, the present disclosure relates to a search architecture for hierarchical data using metadata defined relationships.

BACKGROUND

Some types of data may be stored in one or more data objects that have pre-defined relationships to one another. For example, tables, rows, or other types of data objects may be hierarchically related to one another. These hierarchically related data objects may improve the storage efficiency of the data or the execution of different operations on the data. Storing data in hierarchically related data objects may be helpful for business or government operations in which data analysis is frequently used.

However, storing data in hierarchically related data objects does have drawbacks. For example, the requirements to execute a search query on these data objects may be less flexible and less convenient than many users are accustomed to. For example, some types of systems may require that an exact attribute name be used. This may be difficult when, for example, a human user attempts to execute a query without using, or even knowing, a unique identifier. Alternatively, a human user may enter a unique identifier with a typographic error. Regardless, this inflexibility in search technology is inconvenient.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates an example set of operations for generating a search index in accordance with one or more embodiments;

FIG. 3 illustrates an example set of operations for executing a search query on a search index and presenting query return values in accordance with one or more embodiments;

FIG. 5 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING A SEARCHABLE ENRICHED INDEX
4. DISPLAYING ENRICHED, HIERARCHICAL SEARCH RESULTS
5. EXAMPLE EMBODIMENT
6. COMPUTER NETWORKS AND CLOUD NETWORKS
7. MISCELLANEOUS; EXTENSIONS
8. HARDWARE OVERVIEW

1. GENERAL OVERVIEW

One or more embodiments improve the searchability of a visualized hierarchical data set. The system may improve the speed with which a system may respond to a request for data corresponding to the visualized hierarchical data set. The system may improve the quality or relevance of results for a request for data corresponding to the visualized hierarchical data set.

One or more embodiments generate data structures (e.g., relational tables) for a visualized hierarchical data set in order for a system to execute a search query associated with the hierarchical data without searching or analyzing the visualized hierarchical data set itself. Furthermore, the system may generate a search index based on metadata that explicitly specifies the data types or values to be indexed. The metadata may also identify the data types to be returned in response to a query. The metadata may be generated based on user input that specifies the data types to be indexed and/or data types to be returned.

While a search corresponding to a visualized hierarchical data set is executed using an alternate data structure such as a relational table, the search results may be presented in relation to the visualized hierarchical data set. As an example, the system may highlight the nodes within the visualized hierarchical data set that are associated with entities corresponding to the search results. The nodes may all be concurrently highlighted or highlighted one at a time as a user traverses the search results. Alternatively, or additionally, the search results may be overlaid on top of the visualized hierarchical data set.

One or more embodiments described in this Specification and/or recited in the claims may not be included in this General Overview section.

2. SYSTEM ARCHITECTURE

Figure 1:
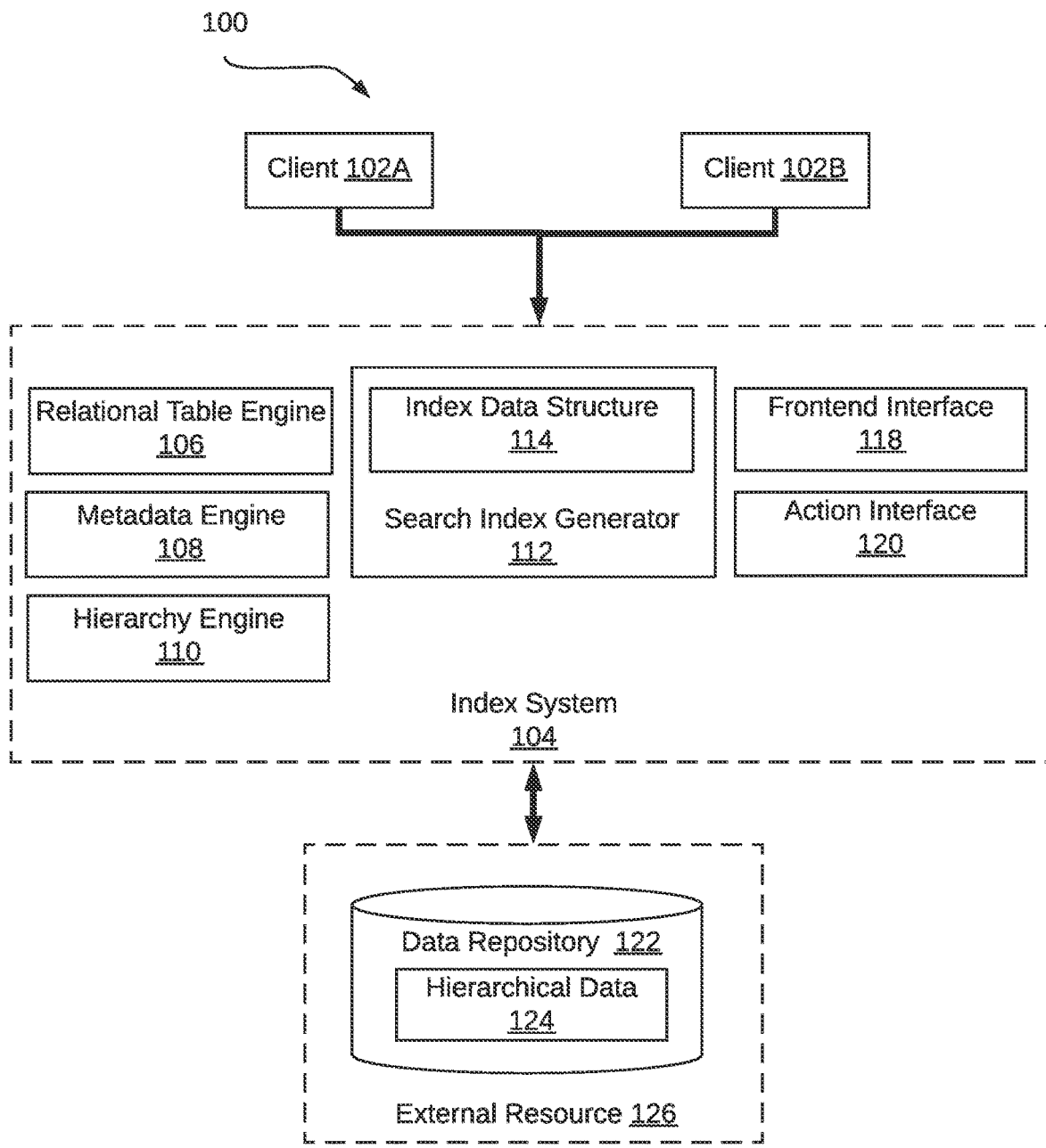
FIG. 1 illustrates a system in accordance with one or more embodiments.

FIG. 1 illustrates a system 100 in accordance with one or more embodiments. As illustrated in FIG. 1, system 100 includes clients 102A, 102B, an index system 104, and an external resource 126. In one or more embodiments, the system 100 may include more or fewer components than the components illustrated in FIG. 1.

The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The clients 102A, 102B may be a web browser, a mobile application, or other software application communicatively coupled to a network (e.g., via a computing device). The clients 102A, 102B may interact with other elements of the system 100 directly or via cloud services using one or more communication protocols, such as HTTP and/or other communication protocols of the Internet Protocol (IP) suite.

In some examples, one or more of the clients 102A, 102B are configured to receive, manipulate, and/or generate data items that are stored in a data repository 122 of the external resource 126. The clients 102A, 102B may transmit data items to the index system 104 for analysis and/or instructions and/or queries regarding hierarchical data 124. The index system 104 may execute analyses, receive queries, and generate query return results as described below in the context of FIGS. 2 and 3.

The clients 102A, 102B may also include a user device configured to render a graphic user interface (GUI) generated by the index system 104. The GUI may present an interface by which a user triggers execution of computing transactions, thereby generating and/or analyzing data items. In some examples, the index system 104 may execute various operations using a trained machine learning model. For embodiments enabled with one or more trained machine learning (ML) models, the GUI of clients 102A, 102B may include features that enable a user to view training data, classify training data, instruct the ML application to generate relational tables and/or data objects, extract a hierarchy (e.g., nodes and their corresponding relationships) from hierarchical data, and other features of the embodiments described below in the context of FIGS. 2 and 3. Furthermore, the clients 102A, 102B may be configured to enable a user to provide user feedback via a GUI regarding the accuracy of the ML model analysis. That is, a user may label, using a GUI, an analysis generated by the ML model as accurate or not accurate, thereby further revising or validating training data. This latter feature enables a user to label data analyzed by an ML model so that the ML model may update its training.

While not shown in the figures, various elements of the index system 104 may include one or more trained machine learning (ML) models. In some examples, an ML model may include one or both of supervised machine learning algorithms and unsupervised machine learning algorithms. Examples of ML models that may be employed in various elements of the index system 104 include, but are not limited to, a graph neural network (GNN), convolutional neural network, linear regression, logistic regression, linear discriminant analysis, classification and regression trees, naïve Bayes, k-nearest neighbors, learning vector quantization, support vector machine, bagging and random forest, boosting, back propagation, and/or clustering models any of which may be adapted to perform the techniques described herein. In some examples, multiple trained ML models of the same or different types may be arranged in an ML "pipeline" so that the output of a prior model is processed by the operations of a subsequent model. In various examples, these different types of machine learning algorithms may be arranged serially (e.g., one model further processing an output of a preceding model), in parallel (e.g., two or more different models further processing an output of a preceding model), or both.

A machine learning model may include or otherwise be in communication with various elements used to execute ML operations. Examples of these elements include a feature extractor and a machine learning engine.

A feature extractor may be configured to identify characteristics associated with data items. A feature extractor may generate corresponding feature vectors that represent the identified characteristics. For example, a feature extractor may identify attributes within training data and/or "target" data that a trained ML model is directed to analyze. Once identified, a feature extractor may extract characteristics from one or both of training data and target data.

A feature extractor may tokenize some data item characteristics into tokens. The feature extractor may then generate feature vectors that include a sequence of values, with each value representing a different characteristic token. In some examples, the feature extractor may use a document-to-vector (colloquially described as "doc-to-vec") model to tokenize characteristics (e.g., as extracted from human readable text) and generate feature vectors corresponding to one or both of training data and target data. The example of the doc-to-vec model is provided for illustration purposes only.

Other types of models may be used for tokenizing characteristics. For example, a feature extractor may analyze hierarchical data to identify nodes and relationships between nodes in the hierarchical data. In other examples, a feature extractor may identify attributes associated with data entities and a schema used to establish hierarchy in the hierarchical data, tokenize the attributes, and generate one or more feature vectors that correspond to entities of the schema and/or the schema itself.

A feature extractor may append other features to the generated feature vectors. In one example, a feature vector may be represented as $[f_1, f_2, f_3, f_4]$, where $f_1, f_2, f_3$ correspond to characteristic tokens and where $f_4$ is a non-characteristic feature. Example non-characteristic features may include, but are not limited to, a label quantifying a weight (or weights) to assign to one or more characteristics of a set of characteristics described by a feature vector. In some examples, a label may indicate one or more classifications associated with corresponding characteristics.

As described above, the system may use labeled data for training, re-training, and applying its analysis to new (target) data. A feature extractor may optionally be applied to new data (yet to be analyzed) to generate feature vectors from the new data. These new data feature vectors may facilitate analysis of the new data by one or more ML models, as described below.

In some examples, training logic may be used to train an ML model using training data. Training logic may receive a set of data items as input (i.e., a training corpus or training data set). Examples of data items include, but are not limited to, data entities (e.g., structures and/or objects, such as fields, arrays, tables) associated with a "target" database schema that corresponds to hierarchical data. The data items used for training may also be associated with one or more attributes, such as those described above in the context of a feature extractor (e.g., field names, field values, field value types).

Turning now to the example embodiment of the system 100 depicted in FIG. 1, the relational table engine 106 may analyze the hierarchical data 124 to generate one or more data objects, such as relational tables, that store data from corresponding portions of the hierarchical data 124. Upon generating the relational tables, the relational table engine 106 may populate the relational tables with attribute names and corresponding attribute values from data stored in the hierarchical data objects.

In some examples, the relational table engine 106 may generate relational tables that correspond to nodes of the hierarchy of the hierarchical data 124. For example, the relational table engine 106 may receive the hierarchy of the hierarchical data 124 as generated by the hierarchy engine 110, described below. Because the hierarchy engine 110 may determine nodes at various levels of the hierarchy in the hierarchical data 124 (e.g., root node, leaf nodes, and the nodes therebetween) as well as the relationships between the nodes, the relational table engine 106 may use these identified nodes and relationships to generate corresponding relational tables.

In other embodiments, the relational table engine 106 may generate relational tables that correspond to the data objects in the hierarchical data by detecting identifiers (e.g., keys, object names) that identify the objects of the hierarchical data 124. The relational table engine 106 may then generate relational tables that correspond to the identified objects.

In embodiments the hierarchical data 124 is already a collection of relational tables (e.g., such as those found in a relational database). In this case, the relational table engine 106 may simply identify keys and/or names that identify the relational tables of the hierarchical data 124 and the foreign (or other) keys that define the relationships between the tables. Once the relational tables and their corresponding relationships are identified, the relational table engine 106 may directly access or copy these relational tables for use in subsequent operations, described below.

The relational table engine 106 may also identify one or more attribute names and corresponding attribute values stored within the various objects of the hierarchical data 124. In some embodiments, the relational table engine 106 may select some or all of these attribute names and corresponding values and store them in generated relational tables. In some embodiments, relational tables generated by the relational table engine 106 may store particular attribute names and corresponding values. In some embodiments the relational table engine 106 generates relational tables so that the hierarchical relationship between attributes and/or data objects found in the hierarchical data set 124 is preserved within the generated relational tables.

In some examples, the relational table engine 106 may identify the one or more attribute names associated with the various data objects of the hierarchical data 124 via any number of techniques. In some examples, the relational table engine 106 may identify the attribute names by detecting metadata (e.g., a tag, label, or other signifier) that indicates a particular entry in an object as an attribute name. In other examples, the relational table engine 106 executes one or more trained machine learning models on the data objects to detect patterns of characters and/or numbers in a particular format that indicate an attribute name. In other examples, the relational table engine 106 may execute a doc-to-vec and/or natural language processing (NLP) machine learning model to detect attribute names within data objects of the hierarchical data 124. Regardless of the technique, the identified attributes and attribute names may be stored in the generated relational tables so that, in some situations, the hierarchical relationship between attributes present in the hierarchical data 124 is maintained in the relational tables.

The metadata engine 108 provides data to the search index generator 112 so that selected information in the relational tables generated by the relational table engine 106 is indexed according to some of the embodiments described herein. That is, metadata received and/or processed by the metadata engine 108 is used to generate an index that supports fast, computationally efficient searches that can provide search return values that (a) may be displayed in the context of a hierarchy of nodes corresponding to the hierarchical data 124, (b) provide data beyond the search query result itself, and/or (c) obviate the computationally inefficient need to traverse or analyze the hierarchical data 124 itself.

The metadata engine 108 may receive, generate, and/or store metadata that identifies various aspects of the data to be indexed by the search index generator 112. For example, the metadata engine 108 may store a set of attributes to be indexed and transmit the set of attributes to the search index generator 112. In this way, the index generator 112 may efficiently generate an index based on the selected set of attributes of the hierarchical data 124 (stored in the relational tables generated by the relational table engine 106). While some embodiments described herein may be applied to all attributes of the hierarchical data 124, other embodiments of the set of attributes include fewer attributes than all of the attributes in the hierarchical data 124.

While the use of the relational tables, metadata, and display techniques described below improve the computational efficiency, speed, and flexibility of the index and search queries, limiting the searchable attributes to those indicated by the metadata engine 108 also improves computational efficiency.

The metadata engine 108 also stores and/or transmits to the search index generator 112 a set of additional attributes names/values to be returned as additional return values, thereby supplying not only the data attribute names that are indexed (i.e., searchable), but also supply additional information with the query result itself. These additional attribute values may be provided in addition to the response to a query itself so that the query response is presented with other relevant data that is not strictly responsive to the query. These additional data may provide context for the search query or provide additional data that may be likely to be requested in associated with the query. For example, a search query for an employee name may return the name of the employee and the additional return values of contact information (e.g., email address, instant messaging identifier, phone number), location, manager, title, and the like.

The metadata engine 108 may directly store the attribute names to be index and the attribute names to be returned as additional return results. The metadata engine 108 may also store references (e.g., links, pointers, addresses) to the attribute names and values that direct the search index generator to the original data objects in the hierarchical data and/or the relational tables storing the attribute names and values. Regardless, these results are provided without analyzing or traversing the hierarchical data 124 itself. This improves the computational speed and efficiency of returning query results, as described herein.

In some examples, the metadata engine 108 may receive metadata that indicates a hierarchical relationship between data items. For example, the metadata engine 108 may detect characters within received metadata that delineate a hierarchical relationship between data items and/or data objects. The metadata engine 108 may interpret these characters (or other indications of hierarchy, like labels, or field names in structured data) and pass the relevant information to the hierarchy engine 110 for further processing.

The hierarchy engine 110 may access the hierarchical data 124 and extract the hierarchical structure associated with the hierarchical data 124. That is, the hierarchy engine 110 may identify the various data objects within the hierarchical data 124 and the various relationships that connect the data objects to one another. The hierarchy engine 110 may extract the hierarchical structure associated with the hierarchical data 124 in any number of ways. In some examples, the hierarchy engine 110 may generate a representation of the extracted hierarchical structure In one example, the hierarchy engine 110 may employ a trained ML model to extract the hierarchy either from relational tables generated by the relational table engine 106 or directly from the hierarchical data 124. One example of a trained ML model that the hierarchy engine 110 may engage is that of a graph neural network (GNN). In this example, training logic may progressively train a GNN using different data sets. For example, a GNN may be trained using supervised training data using one or more labeled graph-representations of training hierarchical data (e.g., a training schema). In some embodiments, these supervised training processes may be executed using generic schema training data.

At a high level, a graph neural network is configured like other types of neural networks in which various "hidden" layers of multiple neurons successively analyze data provided via an input layer to generate a prediction via an output layer. Unlike other types of neural networks, such as convolutional neural networks, GNNs are adapted for the analysis of graphical data in part because they can analyze graphical data collectively and in its entirety, as opposed to segmented or piece-wise analysis often executed by a convolutional neural network.

Examples of GNN algorithms that the hierarchy engine 110 may engage include, but are not limited to, a graph convolution network (GCN), gated graph convolution network (G-GCN), and graph isomorphism network (GIN). These specific graph algorithms are adapted for the analysis of graphical data, which lend themselves to the identification of nodes in hierarchical data and detection of the various relationships connecting the nodes. In turn, an analysis of a GNN may be used to conveniently render data objects in hierarchical data as a graph of nodes and edges (representing relationships between data objects).

In other examples, the hierarchy engine 110 may analyze relational tables generated by the relational table engine 106 to identify a hierarchy of nodes that is associated with the hierarchy of the hierarchical data 124. For example, the hierarchy engine 110 may use one or more keys (e.g., primary keys, super keys, foreign keys) to uniquely identify the relational tables and the various relationships between the relational tables. By using the keys, the hierarchy engine 110 may extract the hierarchy associated with the hierarchical data 124 via the generated relational tables.

In still other examples, in which the data objects of the hierarchical data 124 are relational data objects of a relational database, the hierarchy engine 110 may identify the storage schema used by the data repository 122 to store data in the objects of the hierarchical data 124. Using this database schema, the hierarchy engine 110 may generate a representation of the hierarchy as a plurality of nodes and the various relationships therebetween.

Once extracted, the hierarchy engine 110 may, in some embodiments, detect, identify, and/or represent the extracted hierarchy as nodes. The representation of the hierarchy may be rendered and/or displayed by other elements of the system 100, as described herein. These nodes may correspond to data objects in the hierarchical data 124, attribute names stored in the hierarchical data 124, or combinations thereof. The hierarchy engine 110 may also detect, identify, and/or represent hierarchical relationships between at least some of the nodes. In some embodiments, the hierarchical data 124 may correspond to database data (e.g., attributes/ values) or relational data objects, and the extracted hierarchy may correspond to a database storage schema. When displayed, the hierarchy engine 110 may represent a most generic category of data as a root node and the most specific categories of data as leaf nodes, with intermediate schema categories as intervening nodes at varying levels of generality.

The search index generator 112, in cooperation with other elements of the system 100, generates a search index that returns query search results and additional return values without resorting to a direct analysis and/or traversal of the hierarchical data 124 itself. For example, the search index generator 112 may generate a search index of the hierarchical data 124 by using: (1) the relational tables generated by the relational table engine 106 (based on the hierarchical data 124); (2) the metadata indicating the attribute names to be indexed and the additional attribute names to be displayed as search return results generated and/or process by the metadata engine 108; and (3) the hierarchy associated with the data objects and nodes of the hierarchical data extracted by the hierarchy engine 110. Using these various inputs, the search index generator 112 may generate the search index according to the embodiments described herein.

The search index generator 112 in FIG. 1 is illustrated as having an index data structure 114 in which index data is stored. In some embodiments, the various attributes, attribute values, and/or references to other data sources that collectively form the index may be stored in the index data structure 114.

In some embodiments, the index data structure 114 is a "flat index" that is a single table data object in which each row stores search return values for each indexed query term. Traditional flat indices store a database node and/or attribute name and corresponding value within a single row. While the index data structure 114 does store searchable attribute names and values in a row, the index data structure 114 also stores many other data items so that return results may be presented (1) in context with additional information and (2) in context of the proper location in the hierarchy of the hierarchical data 124 (3) without the system directly traversing or analyzing the hierarchical data 124 itself when execute the search instructions.

To accomplish the computational efficiency and the completeness of data returned in a search result as described herein, the index data structure 114 stores much more than a single indexed attribute/value pair in a row, as done in traditional flattened indexes. Instead, each row of the index data structure 114 stores an indexed attribute name and corresponding attribute value, as well (1) as the additional attribute values and corresponding values to be displayed along with the indexed attribute and (2) hierarchy information so that the indexed attribute may be displayed in the context of its proper location within the hierarchical data.

Because each row in the table index data structure 114 for each corresponding indexed attribute includes these data types, the index data structure 114 includes multiple occurrences of data duplication. For example, a particular indexed attribute that is an intervening node between a root node and a leaf node may include the indexed attribute/value pair itself, as well as attribute names/values of one or more of the nodes closer to the root and/or leaf nodes and metadata indicating the level of these additional nodes. Similarly, if any of the nodes closer to the root and/or leaf nodes is also an indexed attribute, then the corresponding rows will include all of the same data as the particular indexed attribute, with the difference being that the metadata stored in the rows will indicate the proper location within the hierarchy.

This level of data duplication in the index data structure 114 has at least two benefits. First, as indicated above, data stored in a row for an indexed attribute may be rendered so that the search return is displayed within its proper location of the hierarchy without the inconvenience and computational intensity needed to traverse the hierarchical data 124 itself. Second, the data stored in the rows may improve the searchability of the data. For example, if the attribute data stored in the rows the index data structure 114 is character string data, then the system may search the index data structure 114 for any occurrences of a search query by simple character matching. This is in contrast to search functions for other forms of hierarchical attribute/value data, in which more precision is required to properly execute a search and return search results. In one illustration, a relational database may require an exact match of an attribute name and/or attribute value to identify occurrences of the search term in the relational database data structures. This deficiency is overcome with the embodiments described herein.

The search index generator 112 may also include functions for receiving search query terms, identifying the results, and passing the search query return results to other elements of the index system 104 for display. For example, other elements of the index system 104 (e.g., frontend interface 118, action interface 120) may render a search interface element in a GUI displayed on a client 102A, 102B. When a search query is entered into the search interface and transmitted to the index system 104, the search index generator receives the search query and executes the search query on the index data structure 114. When identifying results of the query to return, the search index generator 112 may pass the identified results to other elements of the index system 104 (e.g., frontend interface 118, action interface 120) for rendering on a client. The search index generator 112 may display search results by executing an embodiment of the operations illustrated in FIG. 3 and described below in more detail.

The search index generator 112 may also receive instructions to generate a search index via a client 102A, 102B. The instructions may include a link, point, reference, address, or other location of the hierarchical data 124, whether in an external resource 126 or a resource internal to the index system 104 (not shown). Once received, the search index generator 112 may generate a search index by executing an embodiment of the operations illustrated in FIG. 2 and described below in more detail.

The frontend interface 118 manages interactions between the clients 102A, 102B and the index system 104. In one or more embodiments, frontend interface 118 refers to hardware and/or software configured to facilitate communications between a user and the clients 102A,102B and/or the index system 104. In some embodiments, frontend interface 118 is a presentation tier in a multitier application. Frontend interface 118 may process requests received from clients and translate results from other application tiers into a format that may be understood or processed by the clients.

For example, one or both of the client 102A, 102B may submit requests to the index system via the frontend interface 118 to perform various functions, such as training an ML model, extracting a hierarchy from hierarchical data, generating relational tables and/or data structures that correspond to hierarchical data, and/or executing queries. In some examples, one or both of the clients 102A, 102B may submit requests to the index system 104 via the frontend interface 118 to view a graphic user interface related to query results generated by the index system 104.

Frontend interface 118 refers to hardware and/or software that may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of the frontend interface 118 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 118 is specified in one or more other languages, such as Java, C, or C++.

The action interface 120 may include an API, CLI, or other interfaces for invoking functions to execute actions. One or more of these functions may be provided through cloud services or other applications, which may be external to the index system 104. For example, one or more components of the index system 104 may invoke an API to access information stored in a data repository (e.g., data repository 122) for use as a training corpus for an ML model or to analyze hierarchical data (e.g., hierarchical data 124). It will be appreciated that the actions that are performed may vary from implementation to implementation.

In some embodiments, the index system 104 may access external resource 126, such as cloud services. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources.

Additional embodiments and/or examples relating to computer networks are described below in Section 6, titled "Computer Networks and Cloud Networks."

Action interface 120 may process and translate inbound requests to allow for further processing by other components of the index system 104. The action interface 120 may store, negotiate, and/or otherwise manage authentication information for accessing external resources. Example authentication information may include, but is not limited to, digital certificates, cryptographic keys, usernames, and passwords. Action interface 120 may include authentication information in the requests to invoke functions provided through external resources.

In one or more embodiments, data repository 122 may be any type of storage unit and/or device (e.g., a file system, database, collection of tables, or any other storage mechanism) for storing data. Further, data repository 122 may include multiple different storage units and/or devices. The multiple different storage units and/or devices may or may not be of the same type or located at the same physical site. Further, data repository 122 may be implemented or may execute on the same computing system as the index system 104. Alternatively, or additionally, data repository 122 may be implemented or executed on a computing system separate from the index system 104. Data repository 122 may be communicatively coupled to the index system 104 via a direct connection or via a network.

Information related to target hierarchical data analyzed by the index system 104 may be implemented across any of components within the system 100. However, hierarchical data 124 is illustrated as stored in the data repository 122 of the external resource 126 for purposes of clarity and convenience of explanation.

As described above, the hierarchical data 124 may be any type of data in which different features of the data are hierarchically related to one another. In some examples, the hierarchical relationships may be present in the data itself. For example, an employee directory is inherently hierarchical data with employees related to one another via management chains and internal organizations (e.g., departments, divisions, subsidiaries). In the example of an employee directory, it is the attributes within the data itself that are hierarchically related to one another. Many other types of hierarchical data are equally applicable, such as political boundaries within a nation (e.g., nation, state, county, municipality).

In other examples, the hierarchical data 124 may not only have attributes arranged in a hierarchy, but also the storage architecture may be hierarchical. In this case, the hierarchical storage architecture reduces the analytical operations that the hierarchy engine 110 executes.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. GENERATING A SEARCHABLE ENRICHED INDEX

FIG. 2 illustrates an example set of operations, referred to collectively as the method 200, for generating a search index in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

The method 200 begins by a system receiving a hierarchical data set of data objects (operation 204). Each of the data objects in the hierarchical data set is related to at least one other data object in the hierarchical data set, and in some cases multiple other data objects. These relationships between the various data objects define the hierarchy of objects relative to one another.

In an example illustration, the hierarchical data set can be thought of as a set of nodes, where each node represents a data object in the hierarchical data set. Connections and relationships between the nodes are represented by "edges" either directly or indirectly connecting nodes to one another. Hierarchically arranged nodes may be related via direct relationships (e.g., parent-child or peer to peer ("sibling")) or indirect relationships (e.g., child-grandparent, root node to leaf node via one or more intervening nodes). The nodes and their edges are a convenient graphical and conceptual illustration that corresponds to the data objects in the hierarchical data set and their corresponding hierarchical relationships.

In some examples, the data objects of the hierarchical set of data may include any of a variety of different types of data objects. In some examples, the data objects of the hierarchical set of data objects may include hierarchically related tables, rows, or other types of data objects. In some examples, the hierarchical set of data objects may include various types of hierarchically related structured or unstructured data objects, such as forms, flat text files, logical memory storage data structures, and the like. In some examples, the hierarchical set of data objects may even include relational database tables. In this case, the method 200 need not execute the operation 212 described below, but instead may adapt the operation 212 so that relational database tables of the hierarchical set of data objects are incorporated into a format that may be analyzed according to the remaining aspects of the method 200.

In some examples, the hierarchically related data objects are each associated with a particular attribute of data. The data objects are then related to one another as a proxy for the hierarchical relationships between the attributes. For example, employee data may be instantiated in a row-type data object. A row object for an employee may be hierarchically related to the row object for the manager of that employee. This simple illustration makes the point that hierarchically related data objects may be a reflection of the hierarchy by which data attributes are related to one another.

The system may discern the hierarchical relationships between data objects using any number of techniques that are based, at least in part, on the types of data objects in the set. For example, some types of data objects may be structured as a logical graph using metadata to define the edges between the data objects. In this example, the system may analyze the metadata to determine the relationships between data objects in the hierarchical data set. In other examples, already described above, the system may apply one or more trained machine learning models, such as a GNN, to the hierarchical set of data objects. The trained machine learning model may generate a graph of nodes and edges that correspond to the data objects and relationships therebetween of the hierarchical data set of objects.

In still other examples, the system may determine the identities of data objects and the relationships between data objects by detecting identifiers associated with the data objects. These identifiers may uniquely identify each of the data objects and also identify references to a unique identifier of one data object in other data objects. A convenient illustration of this mechanism is that of primary keys and foreign keys used in relational data objects. A similar mechanism may be used to identify relationships between data objects even if the data objects are not associated with a relational database. The system may also use natural language processing machine learning models to identify words, phrases, or other patterns of text that occur in multiple different data objects to identify hierarchical relationships between data objects.

The system may receive metadata that prescribes the selected aspects of the hierarchical data set of objects on which to generate an index (operation 208). More specifically, the system may receive metadata that prescribes (1) the attributes in the objects of the hierarchical data object set to be indexed and displayed as part of a query return result and (2) additional attributes to be displayed with the indexed attribute as an additional query return result. These additional attributes may also (but not necessarily) be indexed. In some examples, these additional attributes are not indexed, but are merely displayed as an additional query return result that complements the displayed query return result value.

In some examples, the received metadata may be instantiated as an instruction set, an executable file, or a binary file to be executed by another process. Regardless of the particular form in which the system receives the metadata, the metadata prescribes the attributes of the hierarchical data set to be (1) indexed so as to be searchable and (2) to be displayed to provide context to the indexed attribute query return value.

The received metadata may also optionally include indications of the hierarchy between attributes associated with the data objects of the hierarchical data set. For example, the metadata may indicate that a first subset of attributes are hierarchically related to one or more attributes in a second subset. The metadata may also indicate the nature of the hierarchical relationship between attributes. This may be used in subsequently described operations to present the hierarchy along with the query return results.

Continuing with the method 200, the system may generate relational data objects to represent the data objects of the hierarchical data set of objects (operation 212). For example, having identified a first set of structured data type forms as "parents" to other data objects in a second set of data objects, the system may generate corresponding relational data objects for each of the data objects in the first set and the second set. The system may then copy, convert, translate, or otherwise reproduce the attribute names and corresponding values (identified in the operation 208) from the hierarchical data objects in the first set and second set to the corresponding relational data structures generated by the system.

Having created these relational data objects and transferred the attribute names and attribute values from the hierarchical data objects to the relational data objects for the attributes to be indexed, the system may continue the operation 212. In some examples, the operation 212 continues by reproducing the relationships present between the hierarchical data objects to the relational data objects. This may be accomplished in any number of ways. For example, the system may use one or more keys (e.g., primary keys, foreign keys, super keys) to identify the relational data objects and establish the relationships between them.

In other examples, a graph neural network may analyze each of the relational data objects as a corresponding node in the graph and identify any directly or indirectly related nodes in the graph. The graph neural network may then generate edges for each node to represent direct relationships to directly related nodes, and generate metadata associated with each node to identify indirect relationships to other indirectly related nodes.

The system then generates a search index based on the metadata prescribing the attribute names (and optionally attribute values) to be indexed (operation 216). The system analyzes, executes, or otherwise interprets the metadata filed received in the operation 208 to identify the attributes to be indexed.

As described above, in some embodiments, the search index generated in the operation 216 may be a "flat index" that is a single table data object in which each row stores search return values for each indexed query term. This type of index file, which may store data in each row as character data and/or string data, in which different attributes are separated by fields within the row or by delimiters within a single field. In this way, the index is searchable by character matching of partial attribute/value character strings. As mentioned above, using this index generates query return results with without the system directly traversing or analyzing the hierarchical data objects when executing the query.

Once the attributes to be indexed are identified in the metadata of the operation 208, the system identifies the attributes within the relational data objects. The system then extracts each of the identified attributes from the relational data objects and stores the identified attribute name in a row of a search index file (operation 220). The system then also stores any related corresponding attribute values in the same row storing the attribute name (operation 220).

Similarly, the system identifies the additional attributes to be displayed as additional query return values that supplement the query return values of the indexed attribute. The system then may locate these additional attributes within the relational data objects. Once located, the system stores these additional attribute names and corresponding values in the same row of the corresponding indexed attribute that the additional query return values are to complement (operation 224). In some cases, a reference to the relational data object that stores the additional attribute return values is stored in the index row rather than the additional attribute values themselves.

The system may then execute a query and display the return values according to the techniques described below in the context of FIG. 3 and the method 300.

There are several benefits of the preceding method and its corresponding architecture. These include, at least, a faster, more computationally efficient index search than is required to traverse the hierarchical data objects themselves. Another benefit of the system is that the index may be searchable using partial attribute names, partial attribute values, root expanders, "wild card" characters replacing a character mid-string, among other conveniences that are not generally available when searching a relational database (which often requires more precision when searching attribute names/keys). Another benefit, described below in Section 4, is that search return results may be presented in the context of the hierarchy inherent in the hierarchical data objects but without the need to traverse the hierarchical data objects themselves.

4. DISPLAYING ENRICHED, HIERARCHICAL SEARCH RESULTS

FIG. 3 illustrates an example set of operations, referred to collectively as the method 300, for executing a search query on a search index and presenting query return values in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

The method 300 begins by the system receiving a query for an indexed attribute (operation 304). The system may receive a query via client-submitted characters (e.g., text or string data, structured or unstructured). These techniques are described above in the context of FIG. 1.

The system may display a hierarchy of nodes, in which the nodes correspond to the data objects of the relational data objects and the displayed arrangement of the nodes corresponds to the hierarchical relationship of the hierarchical data set (operation 308). As described above, the hierarchy of nodes may be generated in any of a number of ways. For example, the nodes may correspond to one or both of the objects in the hierarchical data set or the corresponding relational data objects. The objects from which the nodes are based on may be identified using unique identifiers associated with each object (in one or both of the sets), GNN analysis, or the analysis of another type of trained machine learning model that can identify common attribute names and combination of names that uniquely identify each relational data object.

The system may determine the edges to display or otherwise determine a configuration in which the display the nodes that indicates their hierarchical relationship to one another using any one or more of the techniques indicated above (operation 308). For example, the system may arrange the nodes according to hierarchical relationships identified in metadata received in the method 200. In another example, the system generates a hierarchical node arrangement (and/or displayed edges connecting one or more of the nodes) based on an analysis of the keys in the relational database objects described above.

Regardless of the mechanism, the displayed hierarchy of nodes need not be generated by reference to the hierarchical data objects themselves. By using any of the techniques described above to derive the hierarchical relationship between nodes (e.g., representing relational data objects), the system may improve the clarity and context the displayed return values provided in response to a query.

The system may then execute the query on the search index generated by the method 200 (operation 312). To execute the query, the system accesses the search index (operation 316). The system may access the search index by connecting to a memory structure in which a search index data object (e.g., a table) is stored. In some examples, the search index may include stored references, pointers, links, or other types of connections to any corresponding relational data objects. In some examples, the system may use these links to access one or more associated relational data objects.

The system then analyzes the attributes in the search index that are indicated as searchable for the occurrence of the query (operation 320). The system may perform this analysis using character/string matching, semantic analysis facilitated by natural language processing, and other similar techniques. The system may also use similarity analysis (e.g., cosine similarity) to identify matches when the search query does not exactly match indexed entries in the search index.

Upon identifying an indexed attribute that matches the query, the system then identifies these occurrences as well as the additional attributes to be returned as query results, as described above (operation 324).

The system then displays the return values that include both the indexed attribute/value and the accompanying additional attributes (operation 328). The system may display the results in a hierarchical format that corresponds to the hierarchy of the hierarchical data objects determined in the operation 308. For example, the return values may be displayed as an overlay on top of a schematic hierarchical structure corresponding to the hierarchical data objects. In other examples, a user may progressively select the various return values by clicking or repeatedly engaging a user interface element (e.g., a forward arrow in a GUI, a keyboard key) that progressively highlights (e.g., with a color or bold face font) return results in a schematic hierarchical structure. The system provides the benefits described above when engaging a user interface element for indexed attributes and/or objects. A user may also select non-indexed attributes to execute a query directly against stored data. That is, the operations described in FIGS. 2 and 3 do not preclude a user from accessing non-indexed information stored in the system.

In still other examples, data corresponding to the nodes in the hierarchy may be presented or highlighted using other techniques to visually identify the query results (including the additional attribute values not indexed but displayed). For example, the system may concurrently display the hierarchy of nodes with all of the corresponding indexed and displayed values where the query results are highlighted or visually accentuated relative to the other presented results that are not responsive to the query. Concurrently displaying the nodes and attribute values may include a parallel structure in which the nodes are presented in their hierarchy and the attribute values are presented in a parallel fashion adjacent to the presented hierarchy. In another example, the attribute values may be overlayed with the hierarchy of nodes. Visually accentuating the query results relative to the attribute values that are indexed/displayed but not responsive to the query may include highlighting, color changes, underlining, font or typeface changes, and the like.

5. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
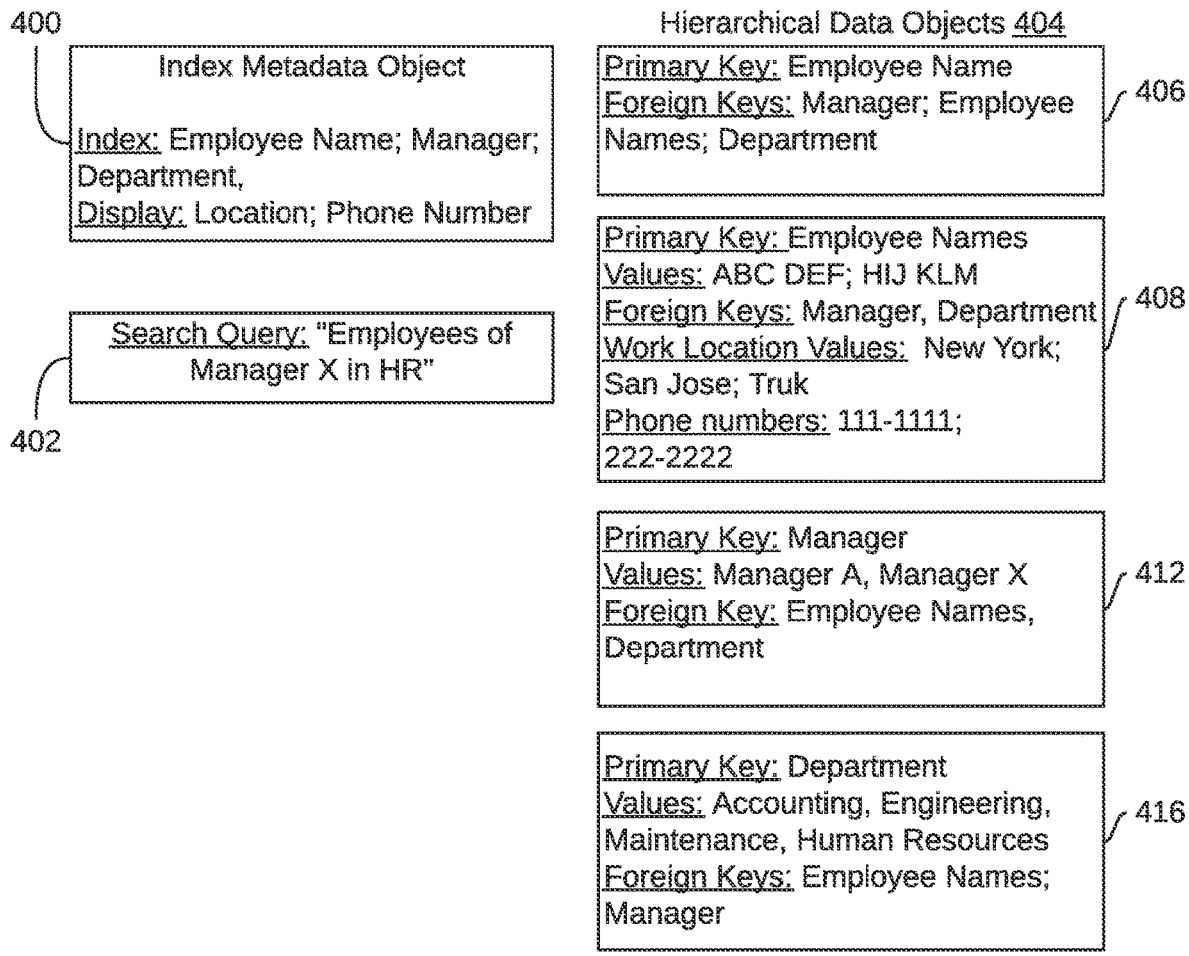
FIGS. 4A, 4B, and 4C illustrate example embodiments of the techniques illustrated in FIGS. 2 and 3 in accordance with one or more embodiments.
Figure 4B:
Figure 4C:
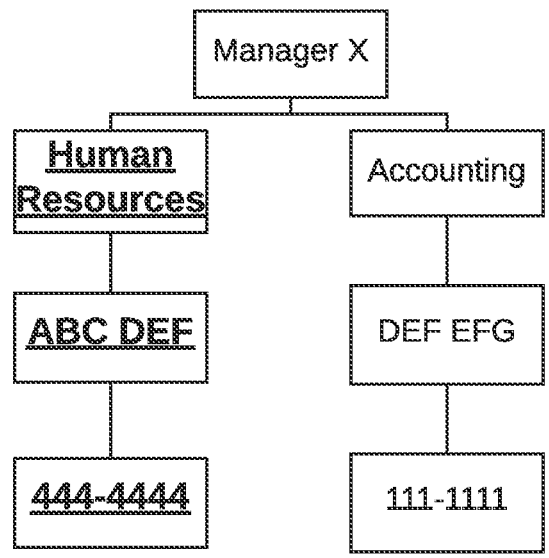

FIGS. 4A, 4B, and 4C schematically illustrate various aspects of some of the embodiments described above. FIG. 4A illustrates an example index metadata object 400, a search query 402, and a set of hierarchical data objects 404. In the illustration shown, the index metadata object 400 received by the system defines index (i.e., searchable) attributes as "employee name," "manger," and "department." The index metadata object 402 also defines additional attributes to be displayed with the indexed attribute as "location" and "phone number." The search query received by the system requests employees of "Manager X" working in human resources ("HR").

The hierarchical data objects 404 include a number of hierarchically related data objects that define an employee directory. A directory object 406 is identified by its primary key of "employee name." In this embodiment, the directory object 406 is the root node of this particular hierarchy. The directory object 406 lists foreign keys that the directory object 406 may access when generating a directory or responding to a query for directory information.

Each of the data objects that corresponds to the foreign keys identified in the directory object 406 respectively identifies its own primary key (i.e., its attribute name) and the associated attribute values, as well as foreign keys.

In one embodiment, the employee names object 408 lists employee names "ABC DEF" and "HIJ KLM" as the first and last names of two employees. Foreign keys in the employee names object 408 are manager and department, both of which are indexed and searchable per the index metadata object 400. Additional data regarding the work location of the employees lists New York, San Jose, and the island of Truk as work locations. Additional data regarding the employee phone numbers is also identified in the data object 408. These work locations and phone numbers are not indexed but, per the index metadata object 400, are displayed along with employee name search results.

The manager object 412 is structured similarly to the employee name object 408. The manager object 412 includes manger name values ("A" and "X") and the indexed foreign keys of employee names and department. The department object 416 includes department values of accounting, engineering, and maintenance. The department object 416 also includes foreign keys of employee name and manager.

FIG. 4B illustrates a concurrent display in which the displayed query return values 424 are presented adjacent to the displayed hierarchy 428 associated with the hierarchical data objects 404. Also, the query return values are presented in a hierarchically parallel arrangement to the displayed hierarchy 428. While only the indexed and displayed attribute values are presented in this FIG. 4B, this need not be the case. In other embodiments additional (or all) attribute values associated with the hierarchical data may be presented with the indexed query results and their associated displayed results visually highlighted (e.g., underlines, bolded, highlighted, accentuated text color).

In this case, the query results are returned as name "ABC DEF" in response to the query for employees working for Manager X in HR. "HR" may be defined in the search index as a synonym for "human resources," thereby accommodating variations in search terminology. The unqueried, but additionally displayed attribute values of location and phone number are also displayed. These are displayed next to the displayed hierarchy 428 to provide additional context for the return values. As described above, neither the query results nor the hierarchy were generated from a traversal of the hierarchical data objects 404 themselves, thereby increasing speed, search flexibility, and reducing the computational requirements needed to execute the process.

FIG. 4C illustrates a different configuration of presenting query return results 432 in which the indexed and displayed query results are overlayed with the hierarchy of nodes. In this example, the possible values for each node is presented and the query and displayed results are visually accentuated by increasing a font size, underlining, and a bold typeface. That is the query submitted in FIG. 4A may generate this alternative display configuration in which the system visually identifies the query return values (employee ABC DEF in HR working for Manager X) by these visual accents. In some examples, the system may serially highlight these results one a time upon successive user instructions (e.g., clicking a user interface element, such as a forward arrow).

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
    receiving a hierarchical data set comprising a plurality of objects, each of the plurality of objects being related to at least one other object in the plurality of objects via a hierarchical relationship of a plurality of hierarchical relationships;
    receiving metadata, corresponding to the hierarchical data set, identifying a first set of one or more attributes to be indexed in a search index;
    generating one or more relational tables to represent the hierarchical data set, the relational tables storing values within the hierarchical data set in association with a corresponding attribute name;
    generating the search index based on the first set of one or more attributes at least by:
        indexing, in the search index, a first value corresponding to a first attribute of the first set of one or more attributes;
        referencing, in the search index, one or more return values that are (a) stored in the one or more relational tables and (b) to be returned in response to any queries comprising the first value;
    subsequent to generating the one or more relational tables to represent the hierarchical data set and the search index referencing the one or more relational tables:
        displaying a hierarchy of nodes corresponding to the plurality of objects in the hierarchical data set;
        concurrently with displaying the hierarchy of nodes, receiving a query for identifying one or more nodes in the hierarchy of nodes based on the first value;
        accessing the search index and the one or more relational tables to identify the one or more return values, from the one or more relational tables, at least by referencing the search index in relation to the first value;
        mapping the one or more return values to the one or more nodes in the hierarchy of nodes; and
        visually identifying the one or more nodes in the hierarchy of nodes in response to the query for identifying the one or more nodes based on the first value.

2. The media of claim 1, wherein the one or more return values are identified without traversing the received hierarchical data set.

3. The media of claim 1, wherein visually identifying the one or more nodes comprises overlaying the hierarchy of nodes with the one or more return values.

4. The media of claim 1, wherein the metadata further identifies a second set of one or more attributes that are to be returned in response to a query for any value of the first attribute, and wherein the one or more return values correspond to the second set of one or more attributes.

5. The media of claim 4, wherein the second set of one or more attributes are not indexed in the search index via the query.

6. The media of claim 1, wherein the operations further comprise generating the metadata based on user input selecting attributes to be indexed and returned.

7. The media of claim 1, wherein:
    the metadata further identifies a set of hierarchical relationships between the identified first set of one or more attributes to be indexed; and
    at least some of the hierarchical relationships of the hierarchy of nodes are based on the set of hierarchical relationships between the identified first set of one or more attributes.

8. A method comprising:
    receiving a hierarchical data set comprising a plurality of objects, each of the plurality of objects being related to at least one other object in the plurality of objects via a hierarchical relationship of a plurality of hierarchical relationships;
    receiving metadata, corresponding to the hierarchical data set, identifying a first set of one or more attributes to be indexed in a search index;
    generating one or more relational tables to represent the hierarchical data set, the relational tables storing values within the hierarchical data set in association with a corresponding attribute name;
    generating the search index based on the first set of one or more attributes at least by:
        indexing, in the search index, a first value corresponding to a first attribute of the first set of one or more attributes;
        referencing, in the search index, one or more return values that are (a) stored in the one or more relational tables and (b) to be returned in response to any queries comprising the first value;
    subsequent to generating the one or more relational tables to represent the hierarchical data set and the search index referencing the one or more relational tables:
        displaying a hierarchy of nodes corresponding to the plurality of objects in the hierarchical data set;
        concurrently with displaying the hierarchy of nodes, receiving a query for identifying one or more nodes in the hierarchy of nodes based on the first value;

accessing the search index and the one or more relational tables to identify the one or more return values, from the one or more relational tables, at least by referencing the search index in relation to the first value;

mapping the one or more return values to the one or more nodes in the hierarchy of nodes; and visually identifying the one or more nodes in the hierarchy of nodes in response to the query for identifying the one or more nodes based on the first value.

9. The method of claim 8, wherein the one or more return values are identified without traversing the received hierarchical data set.

10. The method of claim 8, wherein visually identifying the one or more nodes comprises overlaying the hierarchy of nodes with the one or more return values.

11. The method of claim 8, wherein the metadata further identifies a second set of one or more attributes that are to be returned in response to a query for any value of the first attribute, and wherein the one or more return values correspond to the second set of one or more attributes.

12. The method of claim 11, wherein the second set of one or more attributes are not indexed in the search index via the query.

13. The method of claim 8, further comprising generating the metadata based on user input selecting attributes to be indexed and returned.

14. The method of claim 8, wherein:

the metadata further identifies a set of hierarchical relationships between the identified first set of one or more attributes to be indexed; and at least some of the hierarchical relationships of the hierarchy of nodes are based on the set of hierarchical relationships between the identified first set of one or more attributes.

15. A system comprising:

at least one device including a hardware processor;

the system being configured to perform operations comprising:

receiving a hierarchical data set comprising a plurality of objects, each of the plurality of objects being related to at least one other object in the plurality of objects via a hierarchical relationship of a plurality of hierarchical relationships;

receiving metadata, corresponding to the hierarchical data set, identifying a first set of one or more attributes to be indexed in a search index;

generating one or more relational tables to represent the hierarchical data set, the relational tables storing values within the hierarchical data set in association with a corresponding attribute name;

generating the search index based on the first set of one or more attributes at least by:

indexing, in the search index, a first value corresponding to a first attribute of the first set of one or more attributes;

referencing, in the search index, one or more return values that are (a) stored in the one or more relational tables and (b) to be returned in response to any queries comprising the first value;

subsequent to generating the one or more relational tables to represent the hierarchical data set and the search index referencing the one or more relational tables:

displaying a hierarchy of nodes corresponding to the plurality of objects in the hierarchical data set;

concurrently with displaying the hierarchy of nodes, receiving a query for identifying one or more nodes in the hierarchy of nodes based on the first value;

accessing the search index and the one or more relational tables to identify the one or more return values, from the one or more relational tables, at least by referencing the search index in relation to the first value;

mapping the one or more return values to the one or more nodes in the hierarchy of nodes; and visually identifying the one or more nodes in the hierarchy of nodes in response to the query for identifying the one or more nodes based on the first value.

16. The system of claim 15, wherein the one or more return values are identified without traversing the received hierarchical data set.

17. The system of claim 15, wherein visually identifying the one or more nodes comprises overlaying the hierarchy of nodes with the one or more return values.

* * * * *